April 2, 1935.  A. J. LAUBY  1,996,477
ARTIFICIAL FISH LURE
Filed Sept. 15, 1933
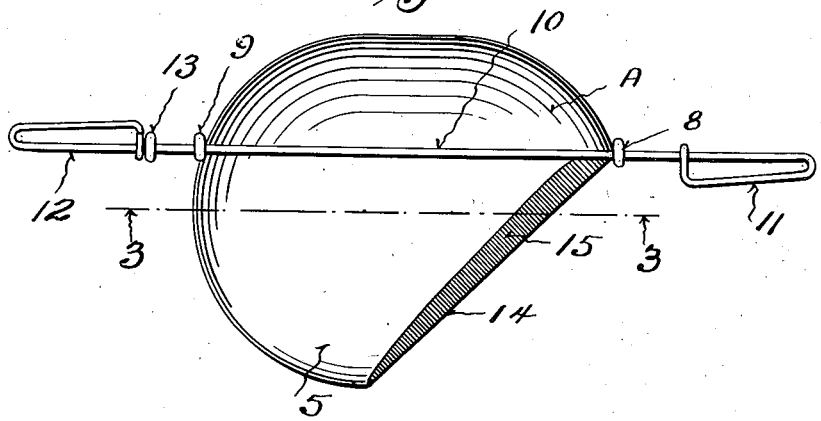
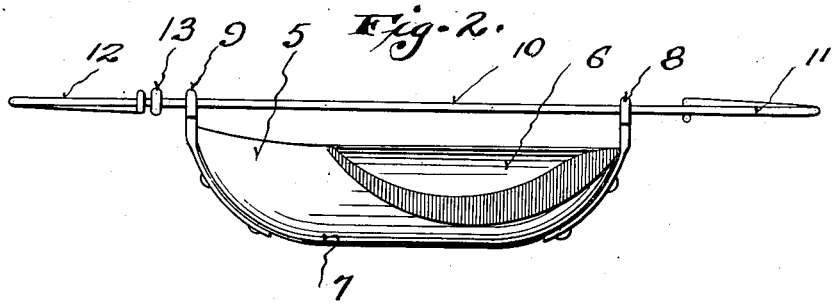
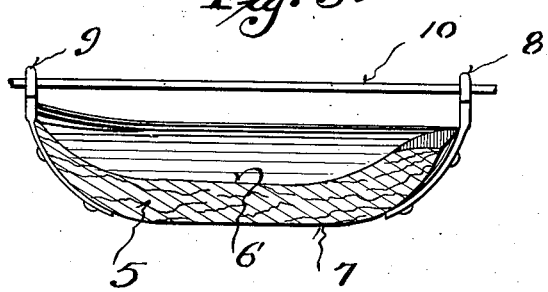
Inventor
A. J. Lauby.
Attorneys Patented Apr. 2, 1935

1,996,477

UNITED STATES PATENT OFFICE 1,996,477

ARTIFICIAL FISH LURE

Anton J. Lauby, Marshfield, Wis.

Application September 15, 1933, Serial No. 689,612

1 Claim. (Cl. 43—45)

This invention appertains to fishing and more particularly to a novel spoon for use in casting, trolling, etc.

One of the primary objects of my invention is the provision of a buoyant spoon in contra-distinction to the thin metallic spoons now in common use, whereby the improved spoon will float on the surface of the water for attracting the fish during casting, etc. and to prevent loss of the spoon and hooks should the hooks catch on a snag.

Another important object of my invention is the provision of novel means for forming the spoon itself and novel means for mounting the spoon on its supporting rod or leader, whereby the spoon will be caused to spin as the same is drawn through the water and to have an erratic swimming motion.

A further object of my invention is the provision of a buoyant spoon provided with guide eyes disposed on one side of the longitudinal axis of the spoon for receiving the supporting rod or leader, the leading edge of the spoon being cut at an angle on one side of the leading guide eye and bevelled for engaging the water to cause the spoon to partake of its spinning and erratic motion.

A still further object of my inventon is to provide an improved spoon of the above character, which will be simple and efficient in use, one that will be easy to manufacture and one which can be placed upon the market at a low cost.

With these and other objects in view, the invention consists in the novel construction, arrangement and formation of parts, as will be hereinafter more specifically described, claimed and illustrated in the accompanying drawing, in which:—

Figure 1 is a top plan view of my improved spoon.

Figure 2 is a side elevation of the same.

Figure 3 is a longitudinal section through the spoon taken on the line 3—3 of Figure 1, looking in the direction of the arrows.

Referring to the drawing in detail, wherein similar reference characters designate the corresponding parts throughout the several views, the letter A generally indicates my improved device, which comprises a concavo-convex spoon body 5. The spoon body 5 is provided with the concave face 6 and the convex outer face 7.

Disposed on one side of the longitudinal axis of the spoon body 5 are the front and rear eyes 8 and 9. These eyes are in longitudinal alinement and rotatably receive the relatively stiff rod or leader 10. The terminals of the leader or rod 10 are provided respectively with loops 11 and 12, which can be in the nature of snap hooks. The front loop 11 is adapted to receive the fish line, while the rear loop 12 is adapted to receive the hooks, which may or may not be provided with a fly. If desired, a bearing collar 13 can be placed on the rod between the guide eye 9 and the loop 12.

In accordance with my invention, the leading edge of the spoon body 5 at one side of the front guide eye 8 is cut away and angled rearwardly as at 14 and is bevelled inwardly as at 15 for cutting into the water and for guiding the water against the concave surface of the spoon.

By referring to Figures 2 and 3 of the drawing, it can be seen that the spoon is formed relatively thick and is formed from a light wood or other buoyant material. Consequently, the spoon will float on the water and the same will not be lost should the line break for any reason.

As the spoon is drawn through the water by the line, the same tends to cut through and dig into the water and as the water follows the bevelled edge 15 and the angled face 14 and impinges against the concave face of the spoon, the spoon rapidly rotates on the rod or leader 10 and tends to zigzag from side to side with an erratic motion.

From the foregoing description, it can be seen that I have provided a novel buoyant spoon, which is of an exceptionally simple and durable character. Obviously, the spoon can be colored or painted in any preferred manner.

Changes in details may be made without departing from the spirit or the scope of this invention, but what I claim as new is:—

A fishing spoon comprising, a concavo-convex body, a supporting rod, guide eyes carried by the opposite ends of the body and arranged on one side of the longitudinal axis thereof to rotatably mount said body on the rod, whereby the greater part of said body is disposed on one side of the rod, the leading edge of a large part of said body being cut away and angled rearwardly from the foremost guide eye, said angled edge being provided with a bevelled face leading toward the concave side of said body.

ANTON J. LAUBY.